Sept. 19, 1933.  T. D. MAUS  1,927,801
WHEEL TIRE
Filed Dec. 19, 1931

INVENTOR
Tennyson D. Maus

ATTORNEYS

Patented Sept. 19, 1933

1,927,801

UNITED STATES PATENT OFFICE 1,927,801

WHEEL TIRE

Tennyson D. Maus, Akron, Ohio, assignor to The Firestone Tire & Rubber Company, Akron, Ohio, a corporation of Ohio Application December 19, 1931
Serial No. 582,057

2 Claims. (Cl. 152—1)

This invention relates to wheel tires and more especially it relates to solid cushion tires such as commonly are used on the wheels of juvenile vehicles.

The chief object of the invention is to provide an improved vehicle tire of the character mentioned which is capable of being more uniformly spliced at its ends than was possible with tires of prior construction. More specifically the invention aims to eliminate cross sectional distortion of tires for juvenile vehicles, especially when large-section tires are mounted upon wheel rims of small diameter.

Figure 1:
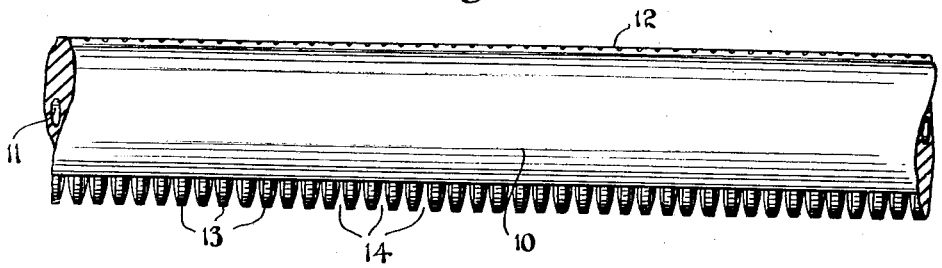
Figure 1 is a fragmentary side elevation of a tire embodying the invention in its preferred form.
Figure 2:
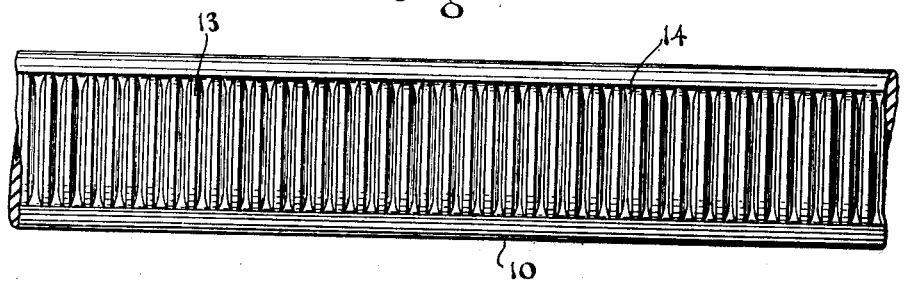
Figure 2 is a bottom plan view thereof.

Referring to the drawing, the improved vehicle tire consists of an elongate, generally cylindrical structure 10 of vulcanized rubber composition having the usual axial recess 11 for the reception of a cable by means of which the tire may be secured to a wheel rim. On one side the tire is formed with a flat, longitudinally extending tread portion 12 that may include a distinctive surface configuration to prevent slippage and to identify the tire.

Diametrically opposite the tread portion 12 the tire is formed with a longitudinally extending series of transversely disposed teeth or lugs 13, 13 that are laterally spaced apart so as to define intervening chordal slots 14, 14, the latter being somewhat deeper in their medial portions by reason of low marginal flanges 15, 15 (Fig. 3) which partly obstruct the ends of said slots, said flanges constituting a continuation of the respective side walls of the tire.

The tire may be economically manufactured in continuous lengths by extruding it from a tubing machine, and concurrently impressing the tread design 12 and the slots 14 in the plastic material, as by means of roller dies. The tire is vulcanized in open heat in the usual manner.

Figure 3:
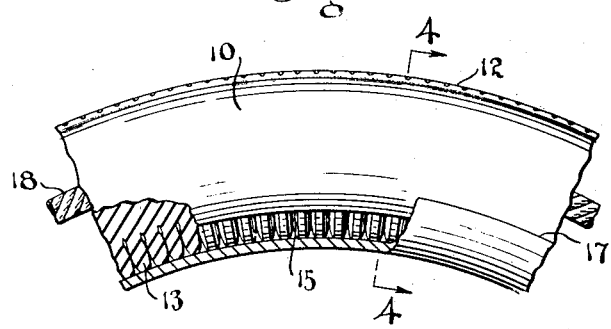
Figure 3 is a fragmentary side elevation of the tire as it appears mounted upon a vehicle wheel, the latter being partly broken away and in section.
Figure 4:
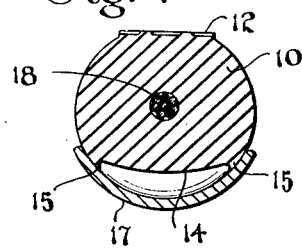
Figure 4 is a section on the line 4—4 of Figure 3.

In mounting a tire for use upon a wheel rim, such as the centrally grooved wheel rim 17, a piece of proper length is severed from the continuous tire structure 10, a cable 18 is threaded through the axial aperture 11 of the severed length, and the ends of the cable brought together and spliced, thus producing an annular tire structure such as is partly shown in Figure 3. In the arcuate flexing of the tire to bring it to annular form, the series of lugs 13 and slots 14 are on the concave side of the tire, and the result of compression on this side of the neutral axis of the tire is to reduce the width of the slots so that in most endless tires the lugs 13 are in laterally abutting relation as shown. The endless tire is stretched over the rim 17 and cemented thereto in the usual manner.

The feature of the lugs 13 and slots 14 on the concave side of the tire prevents transverse distortion of the tire when its ends are joined to make it endless, and thereby facilitates the joining of said ends in a neat and uniform splice. The improved construction also assures that the tire will fit the wheel rim transversely, and this is true with every size of rim and tire.

The provision of the flanges 15 across the ends of the slots 14 causes the slot openings to be more remote from the margins of the rim 17 whereby there is less possibility of dirt entering the slots if the tire is imperfectly cemented to the rim. Preferably the lateral faces of the lugs 13 are arcuate as shown, so that when the ends of a tire are brought together for splicing, the lateral faces of the lugs first make local contact with each other, and then offer progressively increasing resistance to compression, with the result that the lugs have greater radial rigidity and the tire is less likely to move relatively of the rim in a circumferential direction due to traction wave, than if the lugs were not in contact with each other.

Modification may be resorted to within the scope of the appended claims which are not limited wholly to the specific construction shown and described.

What is claimed is:

1. A wheel tire comprising a generally cylindrical rubber structure formed on one side with a longitudinal series of chordal slots and intervening lugs, the latter being closely spaced so as laterally to abut each other when the tire is bent to annular form, and so shaped as to offer progressively increasing resistance to compression while the tire is being so bent.

2. A tire as defined in claim 1 in which the lateral faces of the lugs are rounded in the direction of their depth.

TENNYSON D. MAUS.